(12) United States Patent
Liu

(10) Patent No.: US 9,958,728 B2
(45) Date of Patent: *May 1, 2018

(54) LCD PANEL AND METHOD FOR MANUFACTURING THE SAME

(71) Applicant: SHENZHEN CHINA STAR OPTOELECTRONICS TECHNOLOGY CO., LTD., Shenzhen, Guangdong (CN)

(72) Inventor: Guohe Liu, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 328 days.

This patent is subject to a terminal disclaimer.

(21) Appl. No.: 14/783,722

(22) PCT Filed: Aug. 18, 2015

(86) PCT No.: PCT/CN2015/087374
§ 371 (c)(1),
(2) Date: Oct. 9, 2015

(87) PCT Pub. No.: WO2017/024603
PCT Pub. Date: Feb. 16, 2017

(65) Prior Publication Data
US 2017/0146858 A1 May 25, 2017

(30) Foreign Application Priority Data

Aug. 13, 2015 (CN) .......................... 2015 1 0495754

(51) Int. Cl.
*G02F 1/1335* (2006.01)
*G02F 1/1368* (2006.01)
(Continued)

(52) U.S. Cl.
CPC ...... *G02F 1/133617* (2013.01); *G02F 1/1341* (2013.01); *G02F 1/1368* (2013.01);
(Continued)

(58) Field of Classification Search
None
See application file for complete search history.

(56) References Cited

U.S. PATENT DOCUMENTS

| 7,576,478 B2* | 8/2009 | Hikmet | C09K 11/02 |
| | | | 313/110 |
| 2010/0208172 A1* | 8/2010 | Jang | B82Y 20/00 |
| | | | 349/71 |

(Continued)

FOREIGN PATENT DOCUMENTS

| CN | 102645777 A | 8/2012 |
| CN | 102866535 A | 1/2013 |

(Continued)

*Primary Examiner* — Dennis Y Kim
(74) *Attorney, Agent, or Firm* — Ladas & Parry LLP

(57) ABSTRACT

An LCD panel and a method for manufacturing are provided. The panel includes: a first substrate and a second substrate disposed opposite to the first substrate; a liquid crystal layer comprising a plurality of liquid crystal molecules and color quantum rods mixed in the liquid crystal molecules, wherein both the color quantum rods and the liquid crystal molecules have a major axis, and a major axis direction of the color quantum rods is identical to a major axis direction of the liquid crystal molecules.

13 Claims, 1 Drawing Sheet

(51) Int. Cl.
*G02F 1/1362* (2006.01)
*G02F 1/1341* (2006.01)

(52) U.S. Cl.
CPC .. *G02F 1/133514* (2013.01); *G02F 1/133528* (2013.01); *G02F 1/133621* (2013.01); *G02F 1/136286* (2013.01); *G02F 2001/13415* (2013.01); *G02F 2001/133614* (2013.01); *G02F 2202/36* (2013.01); *G02F 2203/04* (2013.01)

(56) References Cited

U.S. PATENT DOCUMENTS

| | | | |
|---|---|---|---|
| 2013/0010229 A1 | 1/2013 | Shin | |
| 2013/0107170 A1 | 5/2013 | Gee | |
| 2013/0341588 A1* | 12/2013 | Jeon | G02F 1/174 257/13 |
| 2014/0362556 A1 | 12/2014 | Cho et al. | |
| 2015/0009440 A1* | 1/2015 | Lee | G02F 2/02 349/42 |
| 2015/0146452 A1* | 5/2015 | Kim | F21V 9/14 362/611 |
| 2016/0320664 A1* | 11/2016 | Kang | G02F 1/133528 |

FOREIGN PATENT DOCUMENTS

| | | |
|---|---|---|
| CN | 103091892 A | 5/2013 |
| KR | 20130047199 A | 5/2013 |

\* cited by examiner

LCD PANEL AND METHOD FOR MANUFACTURING THE SAME

TECHNICAL FIELD OF THE INVENTION

The present invention relates to a liquid crystal display technology, and in particular to a liquid crystal display (LCD) panel and a method for manufacturing the same.

BACKGROUND OF THE INVENTION

Quantum rods, like quantum dot (QD), are a nanomaterial formed by a limited number of semiconductor atoms. Different from quasi-zero-dimensional QD materials, the quantum rods are a one-dimensional material whose size in one direction is far larger than those in the other two directions. Such structural anisotropy results in an optical anisotropy, which is unique to the quantum rod materials. Said optical anisotropy refers to that a major axis direction of the long axis of the quantum rods is much more capable than the direction perpendicular to the major axis direction in light absorption and emission. Polarization efficiency of the quantum rods can be as high as 96%, equivalent to the polarization efficiency of mainstream iodine-based polarizers.

The quantum rods need an alignment treatment in application processes to ensure that all the quantum rods are parallel to the same direction, so to fully make use of the optical anisotropy of the quantum rods. The alignment of the conventional quantum rods is performed generally by a thin film extension technology, but this requires production of extensive thin films and introduction of extensive technology individually. The processes are more complex, and alignment efficiency of the quantum rods is low. Moreover, conventional display devices can only show a limited variety of colors, instead of different greyscale images in the same color.

Therefore, there is a signification need to provide an LCD panel and a method for manufacturing the same for solving the problems existing in the prior art.

SUMMARY OF THE INVENTION

An objective of the present invention is to provide an LCD panel and a method for manufacturing the same for solving the technical problems of a low color gamut and a high production cost in the prior art display panels.

To achieve the foregoing objective, an LCD panel constructed in the present invention includes: a first substrate and a first polarizer disposed outside the first substrate; a second substrate disposed opposite to the first substrate, the second substrate comprising a switch array layer, the switch array layer comprising a plurality of thin film transistors, and a second polarizer disposed outside the second substrate; a liquid crystal layer comprising a plurality of liquid crystal molecules and color quantum rods mixed in the liquid crystal molecules, wherein both the color quantum rods and the liquid crystal molecules have a major axis, and a major axis direction of the color quantum rods is identical to a major axis direction of the liquid crystal molecules; the color quantum rods comprising a red quantum rod, a green quantum rod, and a blue quantum rod; when the thin film transistors are in an off state, from the second substrate to the first substrate, the color quantum rods are arranged in twist with the liquid crystal molecules; under an irradiation of a backlight source, a polarization direction of the second polarizer is identical to the major axis direction of the color quantum rods near the second substrate, and the color quantum rods twist with the liquid crystal molecules such that the major axis direction of the color quantum rods near the second substrate is identical to a polarization direction of the first polarizer; the LCD panel now has a first brightness.

In the LCD panel of the present invention, when the thin film transistors are in an incomplete on state, from the second substrate to the first substrate, the color quantum rods are arranged in twist with the liquid crystal molecules; under the irradiation of the backlight source, there is a predetermined angle between the polarization direction of the second polarizer and the major axis direction of the color quantum rods near the second substrate, and the color quantum rods twist with the liquid crystal molecules such that there is the predetermined angle between the major axis direction of the color quantum rods near the second substrate and the polarization direction of the first polarizer; the LCD panel now has a second brightness.

In the LCD panel of the present invention, when the thin film transistors are in a complete on state, from the second substrate to the first substrate, the color quantum rods twist with the liquid crystal molecules to be perpendicular to the first substrate; under the irradiation of the backlight source, the polarization direction of the second polarizer and the major axis direction of the color quantum rods near the second substrate are perpendicular to each other, and the major axis direction of the color quantum rods near the first substrate and the polarization direction of the first polarizer are also perpendicular to each other; the LCD panel now has a third brightness; wherein the first brightness is larger than the second brightness, and the second brightness is larger than the third brightness.

In the LCD panel of the present invention, the first substrate comprises a color resist layer, and the color resist layer comprises a red color film, a green color film, and a blue color film.

In the LCD panel of the present invention, a data line utilized to input a data signal, and a scanning line utilized to input a scanning signal; the brightness of the LCD panel is controlled according to the data signal and the scanning signal.

To achieve the foregoing objective, an LCD panel constructed in the present invention includes: a first substrate; a second substrate disposed opposite to the first substrate, a liquid crystal layer comprising a plurality of liquid crystal molecules and color quantum rods mixed in the liquid crystal molecules, wherein both the color quantum rods and the liquid crystal molecules have a major axis, and a major axis direction of the color quantum rods is identical to a major axis direction of the liquid crystal molecules.

In the LCD panel of the present invention, the color quantum rods comprise a red quantum rod, a green quantum rod, and a blue quantum rod.

In the LCD panel of the present invention, the second substrate comprises a switch array layer, the switch array layer comprising a plurality of thin film transistors; there is a second polarizer disposed outside the second substrate, and there is a first polarizer disposed outside the first substrate; when the thin film transistors are in an off state, from the second substrate to the first substrate, the color quantum rods are arranged in twist with the liquid crystal molecules; under an irradiation of a backlight source, a polarization direction of the second polarizer is identical to the major axis direction of the color quantum rods near the second substrate, and the color quantum rods twist with the liquid crystal molecules such that the major axis direction of the color quantum rods near the second substrate is identical to a polarization direction of the first polarizer; the LCD panel now has a first brightness; when the thin film transistors are in an incomplete on state, from the second substrate to the first substrate, the color quantum rods are arranged in twist with the liquid crystal molecules; under the irradiation of the backlight source, there is a predetermined angle between the polarization direction of the second polarizer and the major axis direction of the color quantum rods near the second substrate, and the color quantum rods twist with the liquid crystal molecules such that there is the predetermined angle between the major axis direction of the color quantum rods near the second substrate and the polarization direction of the first polarizer; the LCD panel now has a second brightness; when the thin film transistors are in a complete on state, from the second substrate to the first substrate, the color quantum rods twist with the liquid crystal molecules to be perpendicular to the first substrate; under the irradiation of the backlight source, the polarization direction of the second polarizer and the major axis direction of the color quantum rods near the second substrate are perpendicular to each other, and the major axis direction of the color quantum rods near the first substrate and the polarization direction of the first polarizer are also perpendicular to each other; the LCD panel now has a third brightness; wherein the first brightness is larger than the second brightness, and the second brightness is larger than the third brightness.

In the LCD panel of the present invention, the first substrate comprises a color resist layer, and the color resist layer comprises a red color film, a green color film, and a blue color film.

In the LCD panel of the present invention, a data line utilized to input a data signal, and a scanning line utilized to input a scanning signal; the brightness of the LCD panel is controlled according to the data signal and the scanning signal.

A method for manufacturing the above-mentioned LCD panel provided by the present invention includes: mixing the color quantum rods and the liquid crystal molecules thoroughly in accordance with a predetermined proportion; and dropping the liquid crystal molecules mixed with the color quantum rods into the liquid crystal layer by a One Drop Filling (ODF) process.

In the method for manufacturing the LCD panel of the present invention, the color quantum rods comprise a red quantum rod, a green quantum rod, and a blue quantum rod.

In the method for manufacturing the LCD panel of the present invention, the second substrate comprises a switch array layer, the switch array layer comprising a plurality of thin film transistors; there is a second polarizer disposed outside the second substrate, and there is a first polarizer disposed outside the first substrate; when the thin film transistors are in an off state, from the second substrate to the first substrate, the color quantum rods are arranged in twist with the liquid crystal molecules; under an irradiation of a backlight source, a polarization direction of the second polarizer is identical to the major axis direction of the color quantum rods near the second substrate, and the color quantum rods twist with the liquid crystal molecules such that the major axis direction of the color quantum rods near the second substrate is identical to a polarization direction of the first polarizer; the LCD panel now has a first brightness; when the thin film transistors are in an incomplete on state, from the second substrate to the first substrate, the color quantum rods are arranged in twist with the liquid crystal molecules; under the irradiation of the backlight source, there is a predetermined angle between the polarization direction of the second polarizer and the major axis direction of the color quantum rods near the second substrate, and the color quantum rods twist with the liquid crystal molecules such that there is the predetermined angle between the major axis direction of the color quantum rods near the second substrate and the polarization direction of the first polarizer; the LCD panel now has a second brightness;

when the thin film transistors are in a complete on state, from the second substrate to the first substrate, the color quantum rods twist with the liquid crystal molecules to be perpendicular to the first substrate; under the irradiation of the backlight source, the polarization direction of the second polarizer and the major axis direction of the color quantum rods near the second substrate are perpendicular to each other, and the major axis direction of the color quantum rods near the first substrate and the polarization direction of the first polarizer are also perpendicular to each other; the LCD panel now has a third brightness; wherein the first brightness is larger than the second brightness, and the second brightness is larger than the third brightness.

In the method for manufacturing the LCD panel of the present invention, the first substrate comprises a color resist layer, and the color resist layer comprises a red color film, a green color film, and a blue color film.

In the method for manufacturing the LCD panel of the present invention, a data line utilized to input a data signal, and a scanning line utilized to input a scanning signal; the brightness of the LCD panel is controlled according to the data signal and the scanning signal.

The LCD panel and the method for manufacturing the same in the present invention enhance a transmittance of the polarizers and the color gamut of the LCD panel and lower the production cost by mixing the color quantum rods and the liquid crystal molecules.

BRIEF DESCRIPTION OF THE DRAWINGS

FIG. 2 is a schematic drawing illustrating the LCD panel when thin film transistors are fully turned on.

DETAILED DESCRIPTION OF THE INVENTION

Figure 1:
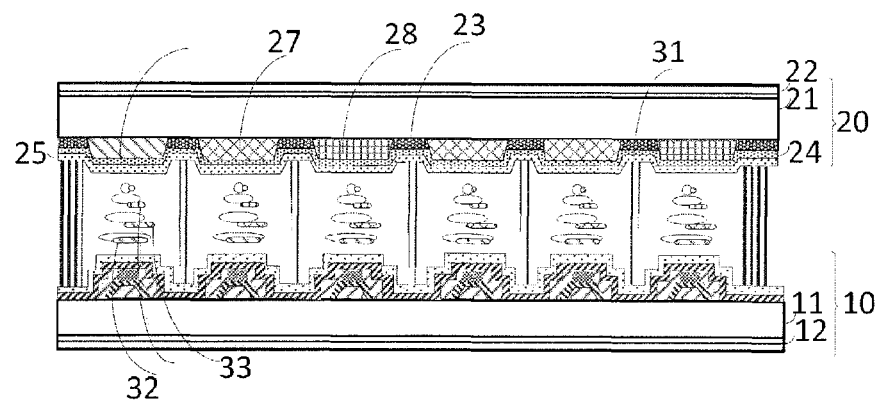
FIG. 1 is a schematic drawing illustrating an LCD panel of the present invention.

Descriptions of the following embodiments refer to attached drawings which are utilized to exemplify specific embodiments. Directional terms mentioned in the present invention, such as "top" and "down", "front", "rear", "left", "right", "inside", "outside", "side" and so on are only directions with respect to the attached drawings. Therefore, the used directional terms are utilized to explain and understand the present invention but not to limit the present invention. In different drawings, the same reference numerals refer to like parts throughout the drawings.

Refer to FIG. 1, which is a schematic drawing illustrating an LCD panel according to a first embodiment of the present invention.

The LCD panel of the present invention includes: a first substrate 20, a second substrate 10, and a liquid crystal layer. The liquid crystal layer is located between the first substrate 20 and the second substrate 10. The first substrate 20 can be, for example, a color filter (CF) substrate, and the second substrate can be, for example, an array substrate. The first substrate 20 includes a first base substrate 21, and a first polarizer 22 positioned outside the first substrate 20. A color resist layer can further be disposed on the first base substrate. The color resist layer includes a red color film 26, a green color film 27, and a blue color film 28. A black matrix 23 can be disposed between two adjacent color films. An insulation layer 24 and a first transparent conductive layer 25 are disposed on the color resist layer. The first transparent conductive layer 25 can include a common electrode. A first alignment film can further be disposed on the first transparent conductive layer 25, and the first alignment film is made by rubbing alignment.

A plurality of spacer 31 can further be disposed on the first transparent conductive layer 25, and the spacers 31 may play a supporting role in pressing the panel. The spacers 31 may be made of a photoresist material.

The second substrate 10 is disposed opposite to the first substrate 20. The second substrate 10 includes a second base substrate 11 and a switch array layer positioned on the second base substrate 11. The switch array layer includes a plurality of thin film transistors. A second transparent conductive layer can further be disposed on the second substrate. The second transparent conductive layer can be positioned on the switch array layer. The second transparent conductive layer can include a common electrode. An insulative layer can be disposed between the switch array layer and the second transparent conductive layer, so as to prevent influencing the performance of the thin film transistors.

A second alignment film can further be disposed on the second transparent conductive layer, and the second alignment film is made by rubbing alignment. The material of the first alignment film and the second alignment film is polyimide.

The second substrate 10 may further include data lines and scanning lines, and a plurality of pixel units defined by the data lines and the scanning lines. The pixel units include red pixels, green pixels, and blue pixels.

As shown in FIG. 1, the liquid crystal layer includes a plurality of liquid crystal molecules and color quantum rods mixed in the liquid crystal molecules. The color quantum rods includes red quantum rods 32, green quantum rods 33, and blue quantum rods 34, in which both the color quantum rods and the liquid crystal molecules have a major axis, and a major axis direction of the color quantum rods is identical to a major axis direction of the liquid crystal molecules.

That is, the liquid crystal molecules are mixed with the red quantum rods 32, the green quantum rods 33, and the blue quantum rod 34, and the major axis directions of the red quantum rods, green quantum rods, and blue quantum rods are identical to the major axis direction of the liquid crystal molecules.

Preferably, the second substrate includes the data lines and the scanning lines, and the plurality of pixel units defined by the data lines and the scanning lines.

Preferably, as shown in FIG. 1, when a scanning signal is at a low level, the thin film transistors are in an off state. Under the condition that liquid crystal molecules are affected by electric field, the color quantum rods are arranged in twist with the liquid crystal molecules from the second substrate 10 to the first substrate 20. When the backlight source irradiates the liquid crystal layer via the second polarizer 12, a nonpolarized light of the backlight source is transformed into a polarized light such that a polarization direction of the second polarizer 12 is identical to the major axis direction of the color quantum rods near the second substrate 10. Under this condition, it is strongest for the red quantum rods, the green quantum rods, and the blue quantum rods to absorb and emit the light. Under the excitation of the polarized light, the red quantum rods, the green quantum rods, and the blue quantum rods respectively emit red light, green light, and blue light. When the red light and green light are incident on the first polarizer 22, their polarization directions have gradually rotated to the polarization direction of the first polarizer 22 with the liquid crystal molecules. The LCD panel now is in a brightest state (i.e. a first brightness). The present invention adds the color quantum rods and makes use of the optical anisotropy of the color quantum rods, so that the LCD device is brighter than the LCD device of the conventional TN display model.

When the thin film transistors are in an incomplete on state, from the second substrate to the first substrate, the color quantum rods are arranged in twist with the color quantum rods. Under the irradiation of the backlight source, there is a predetermined angle between the polarization direction of the second polarizer 12 and the major axis direction of the color quantum rods near the second substrate 10. Under this condition, the light absorption and emission of the red quantum rods, the green quantum rods, and the blue quantum rods are not very strong. Under the excitation of the polarized light, the red quantum rods, the green quantum rods, and the blue quantum rods respectively emit the red light, green light, and blue light. When the red light, green light, and green light are incident on the first polarizer 22, their polarization directions have gradually rotated with the liquid crystal molecules, so that there is also a predetermined angle between that and the polarization direction of the first polarizer 22. The LCD panel now has a second brightness (a brighter state). In this state, only pure liquid crystal molecules exist in the liquid crystal layer of the LCD panel of the conventional TN display model. Due to the addition of the quantum rods, the LCD panel is brighter than that only having the pure liquid crystal molecules.

Figure 2:
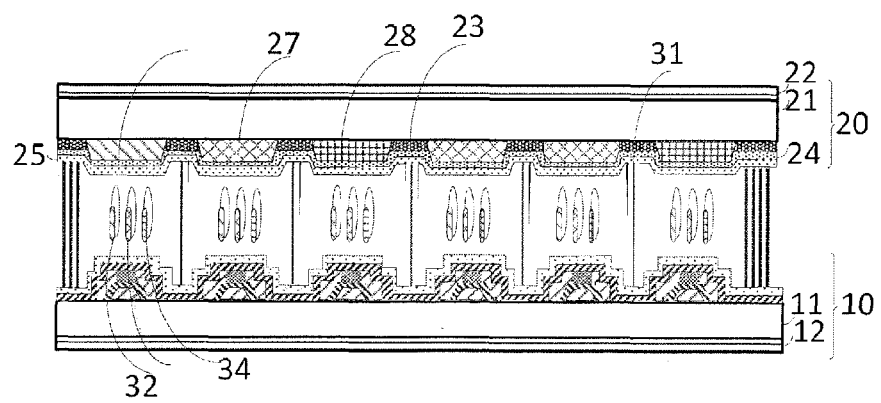

As shown in FIG. 2, when the scan signal is at a high level, the thin film transistors are fully in an on state. Under the effect of the electric field, the liquid crystal molecules rotate to the position as shown in FIG. 2. Meanwhile, the color quantum rods also rotate with the liquid crystal molecules to be perpendicular to the first substrate 20 or the first substrate 20. When the backlight source irradiates the liquid crystal layer via the second polarizer 12, since the polarization direction of the light is throughout perpendicular to the major axis direction of the liquid crystal molecules and the color quantum rods, the light absorption and emission of the red quantum rods, the green quantum rods, and the blue quantum rods are very weak. Therefore, the polarization state of the light is almost not affected by the color quantum rods. When the light is incident on the first polarizer 22, the polarization direction thereof is perpendicular to the polarization direction of the first polarizer 22 (that is, the polarization direction of the second polarizer and the major axis direction of the color quantum rods near the second substrate are perpendicular to each other, and the major axis direction of the color quantum rods near the first substrate and the polarization direction of the first polarizer are also perpendicular to each other). The LCD panel now is in a darkest state (i.e. a third brightness).

The first brightness is larger than the second brightness, and the second brightness is larger than the third brightness. Since the color gamut of the panel of the conventional TN display model is relatively narrow, it can better improve the color gamut of the panel by adding the quantum rods.

Preferably, the data lines are utilized to input the data signals, and the scanning lines are utilized to input the scanning signals. The brightness of the LCD panel can be controlled according to the data signals and the scanning signals. That is, the brightness of the LCD panel is controlled by setting the magnitude of the data signals and the scanning signals.

A desired color of the backlight source of the LCD panel of the embodiment may be white.

The method for manufacturing the LCD panel of the embodiment includes the following steps:

S101, mixing the color quantum rods and the liquid crystal molecules thoroughly in accordance with a predetermined proportion;

after fabricating the color filter substrate and the array substrate, carrying out the fabrication of the liquid crystal layer; first mixing the liquid crystal molecules and the red quantum rods, the green quantum rods, and the blue quantum rods in accordance with a predetermined proportion; and S102, dropping the liquid crystal molecules mixed with the color quantum rods into the liquid crystal layer by a One Drop Filling (ODF) process.

On the basis of the step S101, the liquid crystal molecules, which have been mixed, drop into the liquid crystal layer by the One Drop Filling (ODF) process.

The LCD panel of the embodiment is a Twist Nematic (TN) type panel.

As shown in FIG. 1, when a scanning signal is at a low level, the thin film transistors are in an off state. Under the condition that liquid crystal molecules are affected by electric field, the color quantum rods are arranged in twist with the liquid crystal molecules from the second substrate 10 to the first substrate 20. When the backlight source irradiates the liquid crystal layer via the second polarizer 12, a nonpolarized light of the backlight source is transformed into a polarized light such that a polarization direction of the second polarizer 12 is identical to the major axis direction of the color quantum rods near the second substrate 10. Under this condition, it is strongest for the red quantum rods, the green quantum rods, and the blue quantum rods to absorb and emit the light. Under the excitation of the polarized light, the red quantum rods, the green quantum rods, and the blue quantum rods respectively emit red light, green light, and blue light. When the red light and green light are incident on the first polarizer 22, their polarization directions have gradually rotated to the polarization direction of the first polarizer 22 with the liquid crystal molecules. The LCD panel now is in a brightest state (i.e. a first brightness). The present invention adds the color quantum rods and makes use of the optical anisotropy of the color quantum rods, so that the LCD panel is brighter than the LCD panel of the conventional TN display model.

When the thin film transistors are in an incomplete on state, from the second substrate to the first substrate, the color quantum rods are arranged in twist with the color quantum rods; Under the irradiation of the backlight source, there is a predetermined angle between the polarization direction of the second polarizer 12 and the major axis direction of the color quantum rods near the second substrate 10. Under this condition, the light absorption and emission of the red quantum rods, the green quantum rods, and the blue quantum rods are not very strong. Under the excitation of the polarized light, the red quantum rods, the green quantum rods, and the blue quantum rods respectively emit red light, green light, and blue light. When the red light, green light, and green light are incident on the first polarizer 22, their polarization directions have gradually rotated with the liquid crystal molecules, so that there is also a predetermined angle between that and the polarization direction of the first polarizer 22. The LCD panel now has a second brightness (a brighter state). In this state, due to the addition of the quantum rods, the LCD panel is brighter than that only having the pure liquid crystal molecules.

As shown in FIG. 2, when the scan signal is at a high level, the thin film transistors are fully in an on state. Under the effect of the electric field, the liquid crystal molecules rotate to the position as shown in FIG. 2. Meanwhile, the color quantum rods also rotate with the liquid crystal molecules to be perpendicular to the first substrate 20 or the first substrate 20. When the backlight source irradiates the liquid crystal layer via the second polarizer 12, since the polarization direction of the light is throughout perpendicular to the major axis direction of the liquid crystal molecules and the color quantum rods, the light absorption and emission of the red quantum rods, the green quantum rods, and the blue quantum rods are very weak. Therefore, the polarization state of the light is almost not affected by the color quantum rods. When the light is incident on the first polarizer 22, the polarization direction thereof is perpendicular to the polarization direction of the first polarizer 22. The LCD panel now is in a darkest state (i.e. a third brightness).

Since the major axis of the quantum rods are always arranged along with the major axis direction of the liquid crystal molecules due to an anchoring force influence, the liquid crystal molecules can be aligned without fabricating extensive thin films and introducing extension technology. Since the addition of the quantum rods enables a part of the polarized light perpendicular to a direction passing through the polarizer to be transformed into a parallel polarized light, the transmittance of the polarizer is effectively enhanced. Moreover, since the color quantum rods emit the light under the excitation of the backlight source, the color gamut of the panel can also be improved for achieving a higher degree of color saturation.

The LCD panel and the method for manufacturing the same in the present invention enhance a transmittance of the polarizers and the color gamut of the LCD panel and lower the production cost by mixing the color quantum rods and the liquid crystal molecules.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A liquid crystal display (LCD) panel, comprising:
   a first substrate and a first polarizer disposed outside the first substrate;
   a second substrate disposed opposite to the first substrate, the second substrate comprising a switch array layer, the switch array layer comprising a plurality of thin film transistors, and a second polarizer disposed outside the second substrate; and
   a liquid crystal layer comprising a plurality of liquid crystal molecules and color quantum rods mixed in the liquid crystal molecules, wherein both the color quantum rods and the liquid crystal molecules have a major axis, and a major axis direction of the color quantum rods is identical to a major axis direction of the liquid crystal molecules; the color quantum rods comprising a red quantum rod, a green quantum rod, and a blue quantum rod;
   when the thin film transistors are in an off state, from the second substrate to the first substrate, the color quantum rods are arranged with the color quantum rods in twist; under an irradiation of a backlight source, a polarization direction of the second polarizer is identical to the major axis direction of the color quantum rods near the second substrate, and the color quantum rods twist with the liquid crystal molecules such that the major axis direction of the color quantum rods near the second substrate is identical to a polarization direction of the first polarizer; the LCD panel having a first brightness.

2. The LCD panel according to claim 1, wherein when the thin film transistors are in an incomplete on state, from the second substrate to the first substrate, the color quantum rods are arranged with the color quantum rods in twist; under the irradiation of the backlight source, a predetermined angle is between the polarization direction of the second polarizer and the major axis direction of the color quantum rods near the second substrate, and the color quantum rods twist with the liquid crystal molecules such that there is the predetermined angle between the major axis direction of the color quantum rods near the second substrate and the polarization direction of the first polarizer; the LCD panel having a second brightness.

3. The LCD panel according to claim 2, wherein when the thin film transistors are in a complete on state, from the second substrate to the first substrate, the color quantum rods twist with the liquid crystal molecules to be perpendicular to the first substrate; under the irradiation of the backlight source, the polarization direction of the second polarizer and the major axis direction of the color quantum rods near the second substrate are perpendicular to each other, and the major axis direction of the color quantum rods near the first substrate and the polarization direction of the first polarizer are also perpendicular to each other; the LCD panel having a third brightness;
wherein the first brightness is greater than the second brightness, and the second brightness is greater than the third brightness.

4. The LCD panel according to claim 1, wherein the first substrate comprises a color resist layer, and the color resist layer comprises a red color film, a green color film, and a blue color film.

5. The LCD panel according to claim 1, further comprising:
a data line utilized to input a data signal, and a scanning line utilized to input a scanning signal;
the brightness of the LCD panel is controlled according to the data signal and the scanning signal.

6. A liquid crystal display (LCD) panel, comprising:
a first substrate;
a second substrate disposed opposite to the first substrate; and
a liquid crystal layer comprising a plurality of liquid crystal molecules and color quantum rods mixed in the liquid crystal molecules, wherein both the color quantum rods and the liquid crystal molecules have a major axis, and a major axis direction of the color quantum rods is identical to a major axis direction of the liquid crystal molecules;
wherein the second substrate comprises a switch array layer, the switch array layer comprising a plurality of thin film transistors;
a first polarizer disposed outside the first substrate, and a second polarizer disposed outside the second substrate;
when the thin film transistors are in an off state, from the second substrate to the first substrate, the color quantum rods are arranged in twist with the liquid crystal molecules; under irradiation of a backlight source, a polarization direction of the second polarizer is identical to the major axis direction of the color quantum rods near the second substrate, and the color quantum rods twist with the liquid crystal molecules such that the major axis direction of the color quantum rods near the second substrate is identical to a polarization direction of the first polarizer; the LCD panel having a first brightness;
when the thin film transistors are in an incomplete on state, from the second substrate to the first substrate, the color quantum rods are arranged in twist with the liquid crystal molecules; under the irradiation of the backlight source, a predetermined angle is between the polarization direction of the second polarizer and the major axis direction of the color quantum rods near the second substrate, and the color quantum rods twist with the liquid crystal molecules such that there is the predetermined angle between the major axis direction of the color quantum rods near the second substrate and the polarization direction of the first polarizer the LCD panel having a second brightness;
when the thin film transistors are in a complete on state, from the second substrate to the first substrate, the color quantum rods twist with the liquid crystal molecules to be perpendicular to the first substrate; under the irradiation of the backlight source, the polarization direction of the second polarizer and the major axis direction of the color quantum rods near the second substrate are perpendicular to each other, and the major axis direction of the color quantum rods near the first substrate and the polarization direction of the first polarizer are also perpendicular to each other, the LCD panel having a third brightness;
wherein the first brightness is greater than the second brightness, and the second brightness is greater than the third brightness.

7. The LCD panel according to claim 6, wherein the color quantum rods comprise a red quantum rod, a green quantum rod, and a blue quantum rod.

8. The LCD panel according to claim 6, wherein the first substrate comprises a color resist layer, and the color resist layer comprises a red color film, a green color film, and a blue color film.

9. The LCD panel according to claim 6, wherein the second substrate further comprises a data line utilized to input a data signal, and a scanning line utilized to input a scanning signal;
the brightness of the LCD panel is controlled according to the data signal and the scanning signal.

10. A method for manufacturing a liquid crystal display (LCD) panel, comprising:
providing a first substrate and a second substrate; wherein the second substrate comprises a switch array layer, the switch array layer comprising a plurality of thin film transistors; and wherein a first polarizer is disposed outside the first substrate, and a second polarizer is disposed outside the second substrate;
mixing a plurality of color quantum rods and a plurality of liquid crystal molecules thoroughly in accordance with a predetermined proportion; and
dropping the liquid crystal molecules mixed with the color quantum rods into a liquid crystal layer disposed on one of the first substrate and the second substrate by a One Drop Filling (ODF) process;
when the thin film transistors are in an off state, from the second substrate to the first substrate, the color quantum rods are arranged in twist with the liquid crystal molecules; under irradiation of a backlight source, a polarization direction of the second polarizer is identical to the major axis direction of the color quantum rods near the second substrate, and the color quantum rods twist with the liquid crystal molecules such that the major axis direction of the color quantum rods near the second substrate is identical to a polarization direction of the first polarizer; the LCD panel having a first brightness;

when the thin film transistors are in an incomplete on state, from the second substrate to the first substrate, the color quantum rods are arranged in twist with the liquid crystal molecules; under the irradiation of the backlight source, a predetermined angle is between the polarization direction of the second polarizer and the major axis direction of the color quantum rods near the second substrate, and the color quantum rods twist with the liquid crystal molecules such that there is the predetermined angle between the major axis direction of the color quantum rods near the second substrate and the polarization direction of the first polarizer; the LCD panel having a second brightness;

when the thin film transistors are in a complete on state, from the second substrate to the first substrate, the color quantum rods twist with the liquid crystal molecules to be perpendicular to the first substrate; under the irradiation of the backlight source, the polarization direction of the second polarizer and the major axis direction of the color quantum rods near the second substrate are perpendicular to each other, and the major axis direction of the color quantum rods near the first substrate and the polarization direction of the first polarizer are also perpendicular to each other; the LCD panel having a third brightness;

wherein the first brightness is greater than the second brightness, and the second brightness is greater than the third brightness.

11. The method according to claim 10, wherein the color quantum rods comprise a red quantum rod, a green quantum rod, and a blue quantum rod.

12. The method according to claim 10, wherein the first substrate comprises a color resist layer, and the color resist layer comprises a red color film, a green color film, and a blue color film.

13. The method according to claim 10, wherein the second substrate further comprises a data line utilized to input a data signal, and a scanning line utilized to input a scanning signal;

the brightness of the LCD panel is controlled according to the data signal and the scanning signal.

* * * * *